United States Patent

[11] 3,578,340

[72] Inventor Henry James Fortune
Swindon, England
[21] Appl. No. 783,883
[22] Filed Dec. 16, 1968
[45] Patented May 11, 1971
[73] Assignee The Plessey Company Limited
Ilford, England
[32] Priority Dec. 22, 1960
[33] Great Britain
[31] 58387/60

[54] RECORD PLAYERS
10 Claims, 3 Drawing Figs.

[52] U.S. Cl. .......... 274/15, 274/23, 274/47
[51] Int. Cl. .......... G11b 17/08
[50] Field of Search .......... 274/23, 15, 14, 47

[56] References Cited
UNITED STATES PATENTS

| | | | |
|---|---|---|---|
| 2,532,293 | 12/1950 | De Weese .......... | 274/23(.1) |
| 2,640,700 | 6/1953 | Mortimer et al. .......... | 274/23(.1) |
| 2,869,877 | 1/1959 | Bard .......... | 274/23(.1) |

*Primary Examiner*—Harry N. Haroian
*Attorney*—Blum, Moscovitz, Friedman & Kaplan

ABSTRACT: A record player employs parallel tracking by having an arm extending across the playing surface during play with a pickup cartridge arranged to run along a track along the arm while its position is measured or determined according to the point in the changing cycle by a low mass swinging arm extending more or less at right angles to the track. The arm carrying the track is arranged to be swung to a position clear of the record during the actual record changing operation of the cycle.

Patented May 11, 1971 3,578,340

2 Sheets-Sheet 1

RECORD PLAYERS

Figure 1:
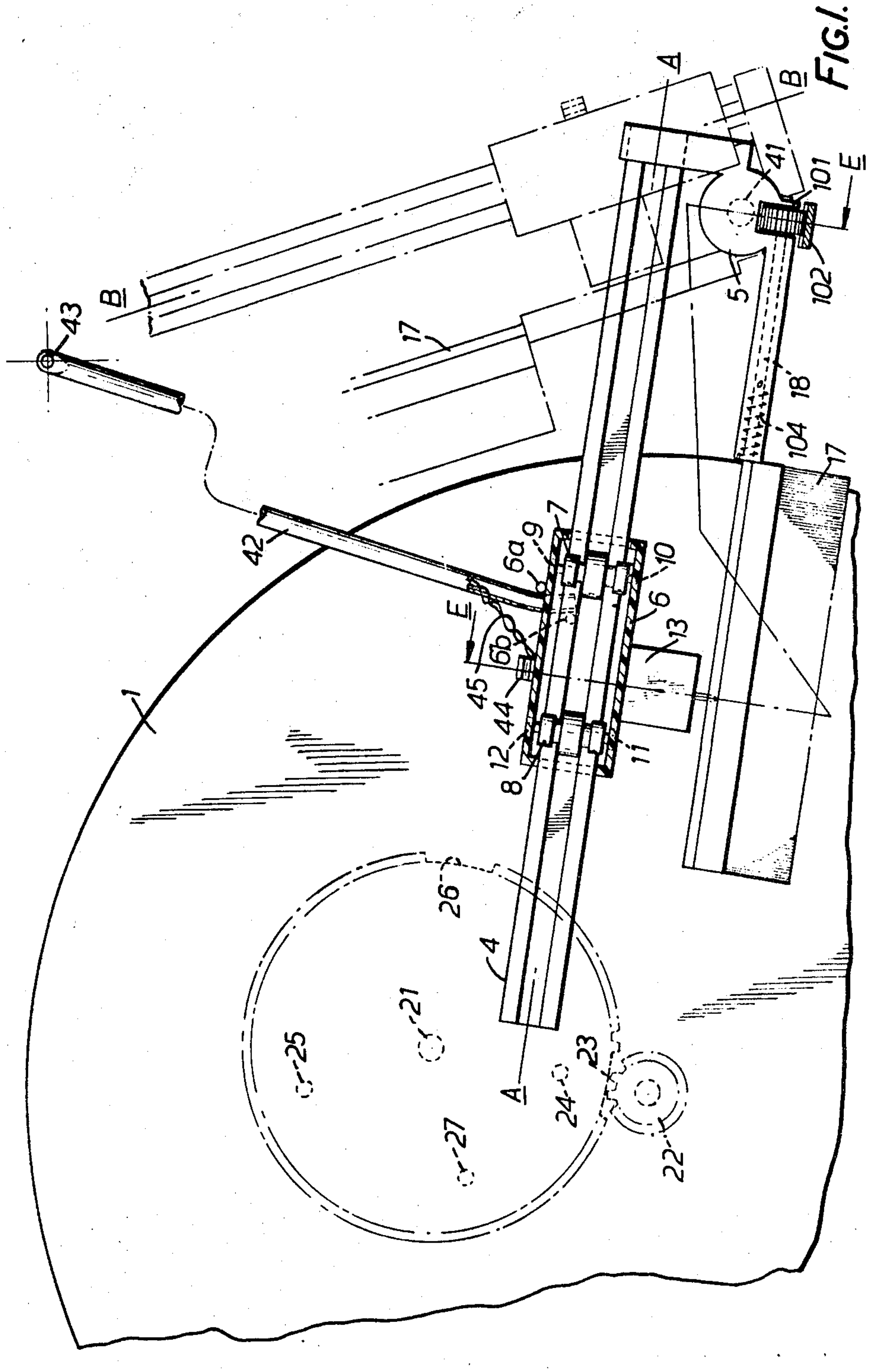

This invention relates to disc record reproducing apparatus in which records can be played automatically in succession and has among its objects the provision of such apparatus in which distortion due to tracking errors inherent in pivoted pickup arm players is reduced. The apparatus of the invention therefore makes use of a so-called parallel-tracking transducer, thus keeping the axis of the stylus-bar tangential to the record groove.

The basic principle of having a carriage mounted on rollers and running along a track extending across the record is well known (see, for example, British Pat. No. 351,469), but the general construction of such designs has resulted in high masses, so that they would not be suited to the playing of microgroove records or to adaptation for automatic record changing apparatus. It is also known to use a high-mass carriage controlled by mechanical means, such as a lead-screw to follow the spiral groove of a disc record but such devices are not well adapted for use with microgroove records, the pitch of which varies through a single recording.

It has also been proposed in British Pat. No. 616,469 to provide a parallel tracking pickup arm having a horizontal pivot so that the arm could be raised obliquely to facilitate the deposit on and removal of records from the turntable.

According to the present invention an automatic record-changing disc record player comprises a motor driven turntable, transducer supporting means including an elongated support, a carriage mounted on said support which is arranged to move freely with low frictional resistance along the length of the support, a transducer, pivotally mounted on said carriage, the stylus of the transducer being adapted to engage a record groove and thus be moved across the record being played, support actuating means for moving the elongated support between a first position in which it extends across the record surface and a position away from the record surface clear of the turntable so as to enable further records to be positioned thereon, and transducer actuating and sensing means for automatically imparting movement to said transducer carriage so as to position it at the beginning of a record and for sensing the end of the record to bring about the return of the transducer supporting means to its position away from the record surface.

According to a feature of the invention, the transducer actuating and sensing means comprises a low mass swinging arm, one end of which is connected to the transducer carriage so as to move with it. Preferably the swinging arm carries the electrical conductors for the transducer.

According to a further feature of the invention a record player is provided with a feeler for detecting the height of a record above the turntable surface in which case there may be provided a ratchet mechanism for carrying the elongated support which is moved in dependence upon the indication given by the feeler to set down the stylus of the transducer on the record surface, with the transducer in an optimum attitude for playing. Conveniently, the ratchet mechanism may be arranged to be free until the feeler contacts the record surface, whereafter a pawl engages the ratchet to keep the support from further downward movement, and in which the pawl is moved while still engaging the ratchet to raise the support to allow the feeler to be withdrawn and to permit a predetermined further downward movement of the support for the stylus of the transducer to contact the record.

In a preferred arrangement of record player according to the invention the feeler is afforded by a cleaning brush or pad which effects an initial cleaning operation on the record. The cleaning brush or pad is preferably carried by the support and arranged to move automatically, before the start of play of each record first into contact with the record to clean it and then to a retracted position clear of the record.

In an especially contemplated arrangement according to the invention, actuation of the elongated support may be obtained by means of first and second cam gears and pinion means preferably constituted by the turntable pinion for engagement with said gears. Each of the cam gears may be provided with a gap in the teeth thereof so that the pinion means may rotate freely during the time a record is being played, the teeth of said first cam gear being arranged to engage the teeth of the pinion means at the beginning of a record changing cycle whilst the gap in the gear teeth of the second cam gear coincides with teeth of the pinion means, said engagement between the first cam gear and the pinion means being effective for raising the elongated support, swinging it to a position in which it extends radially across a record on the turntable and lowering the support so that the brush or pad makes cleaning engagement with the record surface, a further gap being provided in the first cam gear and interengaging abutments provided on said first and second cam gears respectively, which engage before said further gap is reached so as to set the second cam gear in mesh with the pinion means, rotation of the second cam gear being effective for compensating for the height of the record surface above the surface of the turntable, raising the cleaning brush or pad out of engagement with the record surface, effecting movement of the carriage to a predetermined distance along the elongated support and lowering of the support so that the transducer stylus contacts the record surface, further interengaging abutments being provided on said cam gears which engage before the gap in the teeth of the second cam gear is reached so as to set the first cam gear in mesh with the pinion means whereupon the cam gears operate to complete the record changing cycle.

Figure 2:
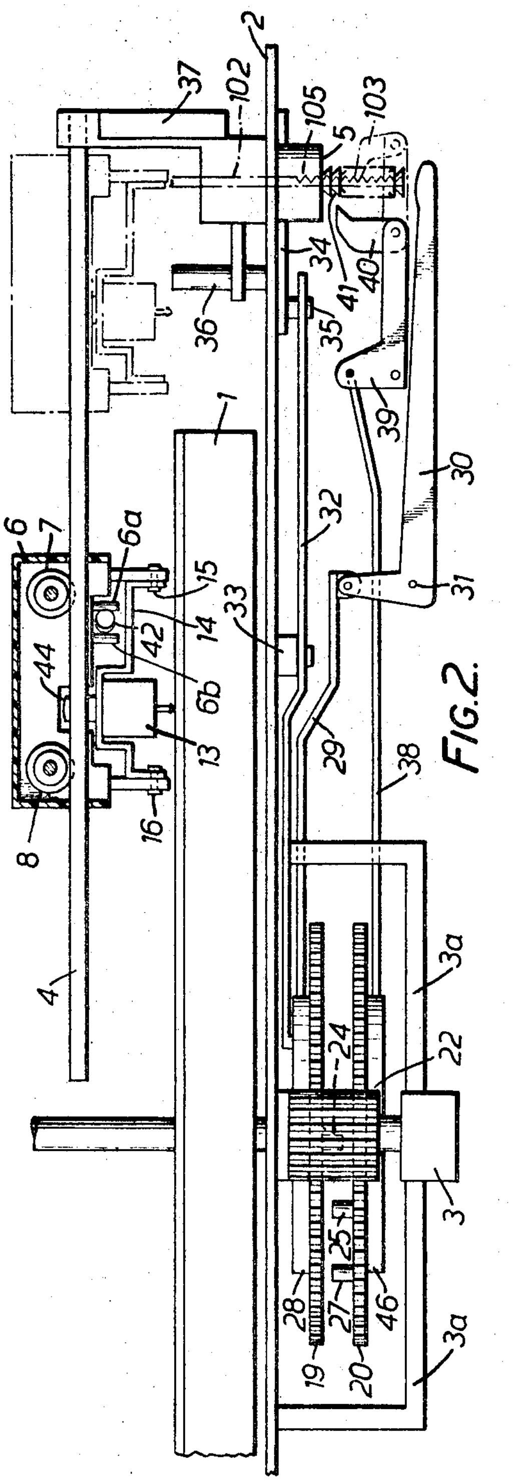
Figure 3:
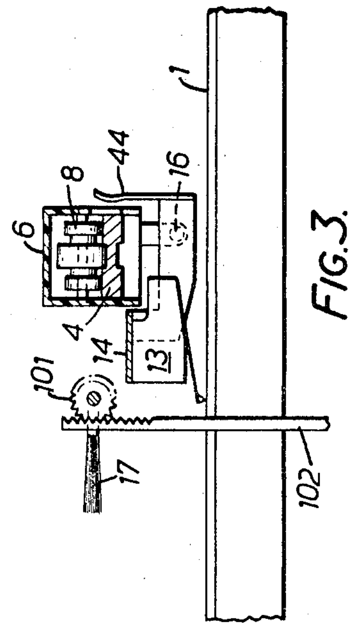

So that the invention may be clearly understood an example of one form of it will now be described in connection with the accompanying somewhat diagrammatic drawings in which FIG. 1 is a plan view showing part of a turntable carrying a 12 inch record, and a parallel tracking pickup arm and its associated components, FIG. 2 is a front elevation of the view shown in FIG. 1, and FIG. 3 is a section on the line E–E of FIG. 1.

The turntable 1 is shown mounted on a supporting plate 2 by means of main bearings 3 carried by supporting brackets 3*a*. A track arm 4 is mounted on a vertically pivoted post 5 so as to be able to swing between a position on the line A–A where it is shown in full in FIG. 1 and a position on the line B–B where it is shown in broken outline. The post 5 is also capable of vertical movement. A carriage 6 is arranged to move freely along the track arm 4 on rollers 7 and 8, and a transducer 13, mounted on mounting bracket 14 is pivoted on the carriage 6 by means of transverse pivots 15 and 16.

An auxiliary swinging tubular arm 41 (FIG. 1) is provided and this is pivoted on the plate 2 at pivot 43. The arm 42 leads the conductors 45 for the transducer 13 to the carriage 6 and also imparts movement to and senses the position of the carriage 6 by means of two pins 6*a* and 6*b*. The arm 42 is designed to have low mass and minimum pivot friction, and the resistance to motion of the carriage 6 is kept low by employing jewel pivots 9, 10, 11 and 12 for the rollers 7 and 8. These pivots are carried in two light alloy bearing housings which fit into suitable recesses in the body of the carriage 6, which may itself be of lightweight plastic material such as polyphenylene oxide. The pivots 15 and 26 carrying the transducer 13 are also arranged to be jewelled pivots.

The vertical post 5 in addition to carrying the tracking arm 4 is also arranged to carry a horizontally extending record-cleaning brush 17 which may be rotated from the position shown in FIG. 1 to a position with its bristles vertical for cleaning the record. The record-cleaning brush 17 is carried in a bored extension 18 so that it can pivot between the position shown in FIG. 1 and a position in which the bristles are normal to the record surface.

Before describing in detail the mechanism for operating the record changer it is believed that an understanding of the invention would be facilitated by a statement of the sequence of operations which occur in use.

The sequence starts with the record changer at rest, with the parallel tracking arm 4 swung outwardly towards the edge of the record changer cabinet. A stack or records is placed on a shouldered record spindle, the stack being controlled horizontally by an overarm or an edge platform. Upon switching the record player control to automatic the tracing arm 4 with the cleaning brush 17 points downwards, will lift vertically sufficient to clear a stack of records which may be on the turntable 1. The arm 4 will then swing in so that the parallel track arm 4 is correctly related to the true line of the turntable.

The arm 4 is then lowered until the brush 17 contacts the surface of the record, so sensing the height of the record and causing the arm 4 to be held in that position. The main cam is stopped and the turntable is caused to rotate three or four revolutions in order for the record to be cleaned free of dust particles. Just before the end of the cleaning operation the arm 4 is raised horizontally and the brush 17 when clear of the record, moves to its horizontal position. The main cam is then restarted to continue the cycle as follows: the auxiliary swinging tubular member 42 moves inwardly, pushing the carriage 6 along the track 4 until it arrives at predetermined selected position, according to the size of the record. This preselected size can be obtained automatically or under manual control. It is important to note that the arrangement for the lifting of the carriage 6 and arm 4 also incorporates means to apply light friction to the carriage 6 when lifted clear of the record. This prevents the carriage 6 from sliding too freely during the time when the carriage 6 is being moved to the selected position. The transducer 13 carried by the carriage 6 is then lowered an amount sufficient to bring its stylus in contact with the record and to maintain the correct height of the transducer pivots above the record. The friction on the carriage 6 is removed when the arm 4 lowers to the playing position.

As the stylus follows the record groove the carriage 6 moves inwardly taking with it the tubular auxiliary arm 42 carrying the transducer leads 45. This arm 42 swings about its pivot 43 and will engage an automatic trip mechanism towards the end of the record and operates the trip mechanism when the fast runout groove is reached, causing the main cam to once again rotate. At this point the tracking arm 4 will lift to its maximum height and will swing outwardly to its rest position, and then another record will drop from the stack. During the outward swing of the arm 4, the brush 17 pivots to point downwards ready for the next operation. The cycle will then be repeated until the last record is cleaned and played when the movement of the arm 4 to its rest position will cause the unit to switch off.

The movement of the tracking arm 4, of the arm 42, of the brush 17 and of the record stacking and dropping mechanism, (which, being conventional, is not shown) are all derived from the motor-driven turntable 1 through a pinion 22 at its center. Since it is desirable for several revolutions of the turntable to take place for cleaning purposes and since this is best carried out before play, a special arrangement of two cam gears driven by the pinion 22 is employed in place of the usual single cam gear.

Two gears 19 and 20 mounted on a common shaft 21 are engaged by a common pinion 22 mounted on the turntable spindle. Both gears have a gap in their teeth at point 23, permitting the turntable 1 to revolve freely without movement of the gears when the two gaps coincide with the teeth of the pinion 22.

At the commencement or end of a cycle, the upper gear 19 is engaged with the pinion 22 by known means, and this gear 19 revolves anticlockwise until pin pin 24, fixed on the underside of gear 19 contacts pin 25 fixed on the upper side of gear 20. Gear 20 is then driven by gear 19 and will revolve with it until a second gap 26 in the gear teeth of gear 19 causes gear 19 to stop when gap 26 lines up with pinion 22. At this point the teeth on gear 20 will still be engaged with pinion 22. The gear 20 will thus continue to rotate whilst gear 19 is stationary until the second pin 27 is mounted on the upper side of gear 20 contacts pin 24. Gear 19 is then driven by gear 20 and will revolve with it until the gap 23 or gear 20 is in line with the pinion 22. Gear 20 will then stop, but gear 19 will carry on rotating until the gap 23 or gear 19 lines up with pinion 22. Both gears are then at rest. It will be seen that the length of time that gear 19 is stopped is controlled by the angular position of the second pin 27.

On the upper side of gear 19 is fixed a cam 28 having a number of cam profiles (not shown) which effect the lift and lowering mechanism of the tracking arm 4 via link 29 and bell crank lever 30 pivoted at 31. The inward and outward swing of the tracking arm 4 is obtained via a lever 32 which is pivoted at 33 and rotates lever 34 through pin 35. Pin 36 fixed to lever 34 locates in a slot extending from a bracket 37 fixedly secured to the tone arm 4 and thus a lobe on cam 28 causes bracket 37 to move angularly to control the angular movement of the tracking arm 4.

A cam 46 is fixed to the lower side of gear 20 is provided with a cam profile (not shown) which controls the height adjustment of the transducer 6 relative to the record surface and also causes the record cleaning brush 17 to be rotated from the vertical to horizontal position.

Control of the height of the tracking arm 4 and hence the carriage 6 and transducer 13 is obtained by means of a spindle 41 attached to the tracking arm 4, the spindle 41 being provided along its length with a number of circular, buttress type grooves. A ratchet pawl 40 mounted on a pivoted bellcrank lever 39 is arranged to engage the grooves of the spindle 41, and movement of the pawl 40 is obtained via the bell crank lever 39 and a mechanical link 38 which contacts the cam profile of the cam 46 fixed to gear 20.

Rotation of the brush 17 within the bored extension 18 is obtained via a rack and pinion action, a pinion 101 being attached to the shank of the brush 17 and a rack 102, which engages with the pinion 101 at one end, arranged parallel with the spindle 41, the rack 102 being operated by means of a further pawl 103 (shown in dotted outline in FIG. 2) which is mounted on an extension of the bellcrank lever 39 (the extension also being shown in dotted outline in FIG. 2) the pawl 103 engaging with teeth 105 on the lower end of the rack 102.

Thus, when the bellcrank lever 39 is operated by means of the cam profile on cam 20, the spindle 41 is raised by means of the pawl 40 and also the rack 102 is raised by means of the pawl 103 so that the pinion 101 is rotated, thereby rotating the brush 17 from the vertical to the horizontal position.

The complete record cleaning and playing cycle is therefore as follows:

Assume the tracking arm 4 to be in its outward rest position with the carriage 6 at its outermost position on the arm 4 and with the brush 17 in the vertical position. The gear 19 is caused to be rotated by means of the pinion 22, and the arm 4 is raised by means of the lever 30, link 29 and the cam profile on cam 28 is attached to gear 19. The arm 4 is then caused to be swung inwards over a record positioned on the record changer turntable 1, by means of lever 34, lever 32, and the cam profile on cam 28, and is then lowered so that the cleaning brush 17 contacts the record.

At this point the gear 19 stops and the gear 20 begins to rotate, and the turntable is rotated two or three times in order to clean the record.

Towards the end of the cleaning cycle, the lever 39 is moved by the link 38 and the cam profile on cam 46, so that the pawl 40 engages with one of grooves in spindle 41, and the lever 39 is actuated such that the spindle 41 and the track 102 (via pawl 103) are raised, so that the brush 17 is lifted clear of the record. The action of raising the rack 102 has the effect of rotating the brush 17 from the vertical to the horizontal position. The auxiliary arm 42 is now caused to be operated by means of the cam 46 and links (not shown) to move the carriage 6 from its outermost position towards the center of the record to a position at which the stylus of the transducer 13 coincides with the outermost groove of the record. The lever 39 is then actuated slightly to allow the transducer stylus to be lowered onto the record but not enough for the brush 17 to be appreciably rotated from the horizontal position. Shortly before this operation gear 19 is rotated once more and gear 20 is caused to be stopped. Gear 19 will continue to rotate until the gap 23 in its teeth coincides with the pinion 22 at which time it will also stop.

During this time, the turntable is continually driven so that the record on the turntable is played and at the end of the record, the auxiliary arm 42 is arranged to operate a trip mechanism (not shown) of known form which causes the gear 19 to once again engage with the pinion 22.

The cam profiles on cam 28 then cause the tracking arm 4 to be raised, and the carriage 6 returned to its outermost position. The arm 4 is then swung out and lowered to its rest position. The action of the arm 4 being swung outwards, causes the pawl 103 to be disengaged from the teeth 105 of rack 102, and the brush 17 is then rotated back to the vertical position by means of a spring 104 contained within the bored extension 18. If there are no more records to be played, the outward movement of the arm 4 is arranged to switch off the record player. If there are more records to be played the cycle is repeated.

In the event that the brush 17 is too soft to act as a temporary support for the pickup arm 4, its function is determining the height of the arm above the playing surface of the record may be performed by a feeler or roller which acts in the same way to engage the record surface.

This measurement of record height and vertical positioning of the tone arm is most important since in normal swinging tone arm pickup arrangements the length of the arm is relied upon to prevent "warp wow," that is the cyclic change in frequency due to excursion of the stylus in the direction of the length of the record groove as the angle of the arm changes when the stylus rides over a lump in the record. The longer the arm the less pronounced in this effect. However, by positioning the pivot very close to the level of the record surface and by maintaining the distance fixed, the effect of "warp wow" can be reduced to negligible proportions.

As has been stated earlier when the carriage 6 is being moved by the arm 42 along the tracking arm 4 it is desirable to apply light friction so that when control is taken off the arm 42 the transducer 13 will stay in position until it engages the required groove. This is achieved by an arm 44 extending upwards from the pivoted mounting 14 of the transducer 13. When the stylus of the transducer 13 is lifted clear of the record the weight of the transducer 13 causes the end of the arm 44 to bear against the side of the track 4. Thus the requisite friction is applied but is always removed immediately the stylus engages the groove.

The track arm 4, in a preferred form, is of channel section and the rollers 7 and 8 have an increased diameter at the center to form guiding means along the track.

Preferably the construction is such that when the turntable 1 is level the track 4 slopes downwards slightly towards the center. Thus during play inaccuracies in level of the apparatus as a whole may result in an increased bias towards the center tending to overcome the friction of the carriage 6 on the track 4 but are unlikely to result in any bias in the opposite direction.

I claim:

1. An automatic record changing disc record player comprising a base plate, a motor driven turntable rotatably mounted on said base plate, transducer supporting means including an elongated support pivotally mounted on said base plate, a carriage mounted on said support which is arranged to move freely with low frictional resistance along the length of the support, a transducer pivotally mounted in said carriage, the stylus of the transducer being adapted to engage a record groove and thus be moved across the record being played, support actuating means including a cam operated lever, for moving the elongated support between a first position in which it extends across the record surface and a position away from the record surface clear of the turntable so as to enable further records positioned thereon, and transducer actuating and sensing means for automatically imparting movement to said transducer carriage so as to position it at the beginning of a record, and for sensing the end of a record to bring about the return of the transducer supporting means to its position away from the record surface.

2. A record player as claimed in claim 1, in which the transducer actuating and sensing means comprises a low mass swinging arm pivotally mounted on the base plate, the free end of said arm being associated with the transducer carriage so as to move with it.

3. A record player as claimed in claim 2, in which the swinging arm carries electrical conductors for attachment to the transducer.

4. A record player as claimed in claim 1, comprising a feeler for detecting the height above the turntable surface of a record to be played.

5. A record player as claimed in claim 4, comprising a ratchet mechanism which carries the elongated support, and which is moved in dependence upon the indication given by the feeler to set down the stylus of the transducer on the record surface, with the transducer in an optimum attitude for playing.

6. A record player as claimed in claim 5, in which the ratchet mechanism is arranged to be free until the feeler contacts the record surface, whereafter a pawl engages the ratchet to keep the support from further downward movement, and in which the pawl is moved, whilst still engaging the ratchet, to raise the support to allow the feeler to be withdrawn and to permit a predetermined further downward movement of the support for the stylus of the transducer to contact the record.

7. A record player as claimed in claim 4, in which the feeler is afforded by a brush or pad, which effects an initial cleaning operation on the record.

8. A record player as claimed in claim 7, in which the brush or pad is carried by the elongated support and is arranged to move automatically before the start of play of each record, first into contact with the record to clean it and then to a retracted position clear of the record.

9. A record player as claimed in claim 8, comprising first and second cam gears and pinion means for engagement with said gears, the cam gears being effective for bringing about actuation of the elongated support.

10. A record player as claimed in claim 9, in which each of the cam gears is provided with a gap in the teeth thereof, so that the pinion means may rotate freely during the time a record is being played, the teeth of said first cam gear being arranged to engage the teeth of the pinion means at the beginning of a record changing cycle whilst the gap in the gear teeth of the second cam gear coincides with the teeth of the pinion means, said engagement between the first cam gear and the pinion means being effective for raising the elongated support, swinging it to a position in which it extends radially across a record on the turntable and lowering the support so that the brush or pad makes cleaning engagement with the record surface, a further gap being provided in the first cam gear and interengaging abutments provided on said first and second cam gears, respectively, which engage before said further gap is reached so as to set the second cam gear in mesh with the pinion means, rotation of the second cam gear being effective for compensating for the height of the record surface above the surface of the turntable, raising the cleaning brush or pad out of engagement with the record surface, effecting movement of the carriage to a predetermined distance along the elongated support and lowering of the support so that the transducer stylus contacts the record surface, further interengaging abutments being provided on said cam gears which engage before the gap in the teeth of the second cam gear is reached so as to set the first cam gear in mesh with the pinion means whereupon the cam gears operate to complete the record changing cycle.